United States Patent
Pal

(10) Patent No.: US 10,613,046 B2
(45) Date of Patent: Apr. 7, 2020

(54) METHOD FOR ACCURATELY MEASURING REAL-TIME DEW-POINT VALUE AND TOTAL MOISTURE CONTENT OF A MATERIAL

(71) Applicant: PROPHECY SENSORS, LLC, Baltimore, MD (US)

(72) Inventor: Biplab Pal, Ellicott City, MD (US)

(73) Assignee: MachineSense, LLC, Baltimore, MD (US)

( * ) Notice: Subject to any disclaimer, the term of this patent is extended or adjusted under 35 U.S.C. 154(b) by 323 days.

(21) Appl. No.: 15/049,098

(22) Filed: Feb. 21, 2016

(65) Prior Publication Data

US 2016/0245765 A1    Aug. 25, 2016

Related U.S. Application Data

(60) Provisional application No. 62/119,293, filed on Feb. 23, 2015.

(51) Int. Cl.
   *G01N 25/66* (2006.01)
(52) U.S. Cl.
   CPC .................. *G01N 25/66* (2013.01)
(58) Field of Classification Search
   None
   See application file for complete search history.

(56) References Cited

U.S. PATENT DOCUMENTS

| | | |
|---|---|---|
| 4,023,940 A | 5/1977 | Shultz |
| 4,131,011 A * | 12/1978 | Ling ................... D06F 58/28 |
| | | 73/29.01 |
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,289,606 B2 | 9/2001 | Gillette et al. |
| 6,405,108 B1 | 6/2002 | Patel et al. |

(Continued)

FOREIGN PATENT DOCUMENTS

| | | |
|---|---|---|
| CN | 201672991 | 12/2010 |
| CN | 102539911 A | 7/2012 |

(Continued)

OTHER PUBLICATIONS

International Search Report and Written Opinion for PCT Application No. PCT/US2016/067814; dated Apr. 6, 2017.

(Continued)

*Primary Examiner* — David M. Gray
*Assistant Examiner* — Geoffrey T Evans
(74) *Attorney, Agent, or Firm* — Fox Rothschild LLP

(57) ABSTRACT

A system and method for accurately measuring the real-time valid dew-point value of a material and determining the total moisture content of the material within the valid dew-point value by using an algorithm during the material drying process. The algorithm estimates the valid dew-point value of the material and the total moisture content of the material by analyzing the sensor data received on a server. The algorithm determines a valid dew-point value by estimating an inflection point for the material, and the total moisture content of the material is determined within the valid dew-point value.

6 Claims, 3 Drawing Sheets

(56) References Cited

U.S. PATENT DOCUMENTS

| | | |
|---|---|---|
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 10,041,844 B1 | 8/2018 | Brady |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0222794 A1 | 10/2005 | Baird et al. |
| 2006/0137105 A1* | 6/2006 | Hong ............... D06F 25/00 8/147 |
| 2006/0168195 A1 | 7/2006 | Maturana |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1* | 7/2014 | Shinta ............... G01N 21/554 422/69 |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233856 A1* | 8/2015 | Samuilov ............... G01K 13/00 702/65 |
| 2015/0261215 A1 | 9/2015 | Blevins |
| 2016/0086285 A1 | 3/2016 | Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |

FOREIGN PATENT DOCUMENTS

| | | | |
|---|---|---|---|
| CN | 103399486 A | 11/2013 | |
| CN | 203362223 U | 12/2013 | |
| CN | 203588054 U | 5/2014 | |
| CN | 104036614 A | 9/2014 | |
| EP | 1836576 B1 | 2/2012 | |
| EP | 2648393 A1 | 10/2013 | |
| WO | WO 2005/086760 A2 | 9/2005 | |
| WO | WO 2010/104735 A1 | 9/2010 | |
| WO | WO 2013-0041440 A1 | 3/2013 | |
| WO | WO 2013/093942 A2 | 6/2013 | |
| WO | WO 2014/044906 A1 | 3/2014 | |
| WO | WO 2014/085648 A1 | 6/2014 | |
| WO | WO 2014/089567 A2 | 6/2014 | |
| WO | WO 2014/117245 A1 | 8/2014 | |
| WO | WO 2015/022036 A1 | 2/2015 | |
| WO | WO 2016137848 A1 * | 9/2016 | ............... G06N 5/04 |
| WO | WO 2017123425 A1 * | 7/2017 | ......... H04L 41/0806 |

OTHER PUBLICATIONS

International Search Report and Written Opinion for PCT Application No. PCT/US16/18820; dated Aug. 4, 2016.

International Search Report and Written Opinion for PCT Application No. PCT/US15/066547; dated Mar. 17, 2016.

Sensors Drive Mobile IoT; Wong, William; Jan. 26, 2015; Electronic Design.

International Search Report and Written Opinion for PCT Application No. PCT/US16/028724; dated Aug. 22, 2016.

Detection of Generalized-Roughness Bearing Fault by Spectral-Kurtosis Energy of Vibration or Current Signals by Fabio Immovilli, et al., IEEE Transactions on Industrial Electronics, vol. 56, No. 11, Nov. 2009.

Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.

Condition Monitoring and Fault Diagnosis of Rolling Element Bearings Based on Wavelet Energy Entropy and SOM by Shuai Shi, et al., dated Aug. 2012, published by IEEE.

Fault Diagnosis of Bearing Based on Fuzzy Support Vector Machine, by Haodong Ma, et al., dated Jan. 2015, published by IEEE.

Investigation of the Mechanical Faults Classification using Support Vector Machine Approach by Zhiqiang Jiang, et al., dated Aug.

(56) References Cited

OTHER PUBLICATIONS 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Precursor Wear Debris in Lubrication Systems by Jack Edmonds, et al., dated May 2000, published by IEEE.
Fault Diagnosis Method Study in Roller Bearing Based on Wavelet Transform and Stacked Auto-encoder, by Junbo Tan, et al., dated Feb. 2015, published by IEEE.
Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Holler, J. et al. (2014). "From Machine-to-machine to the Internet of Things: Introduction to a New Age of Intelligence." Chapters 2, 4, 5, 7, 10, 12. Academic Press. DOI:10.1016/B978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.

\* cited by examiner

METHOD FOR ACCURATELY MEASURING REAL-TIME DEW-POINT VALUE AND TOTAL MOISTURE CONTENT OF A MATERIAL

CROSS-REFERENCE TO RELATED APPLICATION

This application claims priority to the U.S. Provisional Patent application No. 62/119,293 filed in the United States Patent and Trademark Office on Feb. 23, 2015, entitled "Method for Accurately Measuring Real-Time Dew-Point Value and Total Moisture Content of a Material". The specification of the above referenced patent application is incorporated herein by reference in its entirety.

FIELD OF INVENTION

The present invention relates generally to a method of accurately measuring real-time dew-point value and total moisture content of a material. More specifically, it relates to accurately measuring the real-time valid dew-point value and estimating the total moisture content of the material within the valid dew-point value using an algorithm during a material drying process.

BACKGROUND

Currently, the existing material drying processes adopt various mechanisms to determine the real-time dew-point value of a material and to estimate the total moisture content of the material. However, these processes do not provide an accurate real-time dew-point estimate as the dew-point of the material may vary over a period during the material drying process. Further, the existing drying process does not allow the system to provide a valid dew-point value within which the system must be capable of estimating the total moisture content of the material.

PCT publication no. WO2013093942 discloses a method and a device for moisture determination and control using real-time measurement of the material moisture content at an inlet and outlet of the drying process, such as in a drying hopper. Here, the drying process is controlled by anticipating the drying load based on the moisture content of the incoming material to be dried.

CN 103399486 discloses a temperature optical energy-saving control method for a plastic dryer. The method adopts a predictive control strategy based on multi-model switching to identify dynamic characteristics of air temperature of the plastic dryer and establish a switching system model of an object under each typical working condition. An optical target function with constraint is established by utilizing a switching rule and a mixed neural network is formed by neural networks for processing a continuous variable and a discrete binary variable together.

U.S. Pat. No. 8,433,443 B2 relates to a method for online monitoring of polymerization reaction in a fluid bed reactor to generate data indicative of imminent occurrence of a discontinuity event (such as sheeting). The method further relates to optional control of the reaction to prevent the occurrence of the discontinuity event.

CN 201672991 relates to a dry and wet bulb temperature acquisition device performing functions of dry and wet bulb temperature acquisition, wireless data receiving and transmitting, and dry and wet bulb temperature display.

U.S. Pat. No. 8,021,462 B2 relates to a dehumidification plant for granular materials having varying physicochemical characteristics, with energy consumption less than that of the dehumidification process. This patent also relates to a process for regenerating at least one process tower in a granular material dehumidification plant.

EP 2186613 B1 relates to a high efficiency system for dehumidifying and/or drying plastic material. The system enables electronic process control of hopper parameters monitored through sensors and devices.

U.S. Pat. No. 6,289,606 B2 relates to an apparatus and a method for controlling moisture content of a particulate material in a hopper. The apparatus comprises a dew-point sensor to output a signal based on the sensed moisture content of the material and a control circuitry to cause the selector to operate based on output signal.

The existing drying process does not allow a system to provide a valid dew-point value within which the system must be capable of estimating the total moisture content of the material. Hence, there is a need for a system that provides an accurate real-time valid dew-point value within which the moisture content of the material can be determined during the material drying process.

SUMMARY

The present invention is related to a system and method for accurately measuring the real-time dew-point value of a material based on which the total moisture content of the material is determined. The method comprises of acquiring data from temperature sensors and dew-point sensors that are positioned at dryer outlets while performing the material drying process. The method receives the sensed data at a server from the sensors by using any of the existing data transmitting technologies such as Programmable Logic Controller (PLC), relay, or wireless sensor networks. Further, the method estimates the initial moisture content of the material before the drying process begins and estimates the total moisture content of the material at any instance during the drying process. The method measures a valid dew-point of the material by determining an inflection point for the material and determines the total moisture content of the material based on the inflection point of the material.

Other objects and advantages of the embodiments herein will become readily apparent from the following detailed description taken in conjunction with the accompanying drawings.

BRIEF DESCRIPTION OF THE DRAWING(S)

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

In accordance with the present invention, the method uses an algorithm for accurately measuring the real-time valid dew-point value of a material and the total moisture content of the material is estimated within the determined valid dew-point value during the material drying process. The material used during the drying process can be a resin, a plastic, or the like.

Figure 1:
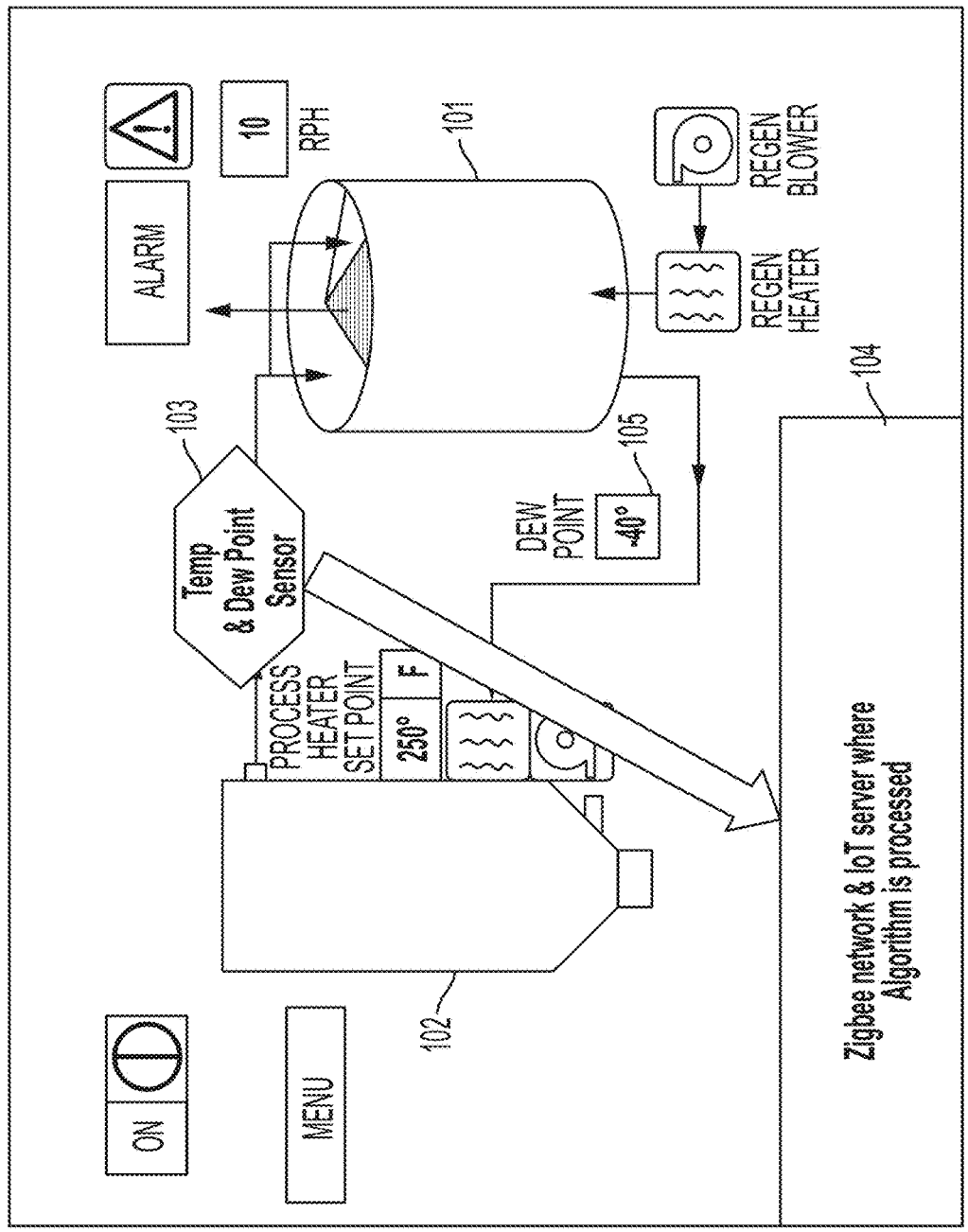
FIG. 1 illustrates a system used in a material drying process according to an embodiment of the present invention.

FIG. 1 illustrates a system used in a material drying process. The system 100 comprises of a dryer unit 101 used as a material dryer by blowing dry air into the unit 101 and a hopper 102 used to maintain the moisture level of the material. The temperature and dew-point sensors 103 are fixed at the dryer outlet for acquiring the data input from the hopper 102 to determine the temperature and the real-time valid dew-point value of the material. The sensor data acquired from the hopper 102 is sent to the server 104 for estimating initial moisture content of the material before starting the drying process. In a preferred embodiment, the system 100 can determine the moisture content of the material when the material is being dried through the drying process using an algorithm. A valid dew-point value 105 for the material inside the dryer unit 101 is determined by using an algorithm and an inflection point is determined for the material. In a preferred embodiment, the total moisture content of the material is determined based on the inflection point estimated for the material by using the algorithm. The real-time valid dew-point value of the material is automatically determined and is transmitted to the hopper 102 for determining the total moisture content of the material within the valid dew-point value by using the algorithm.

Figure 2:
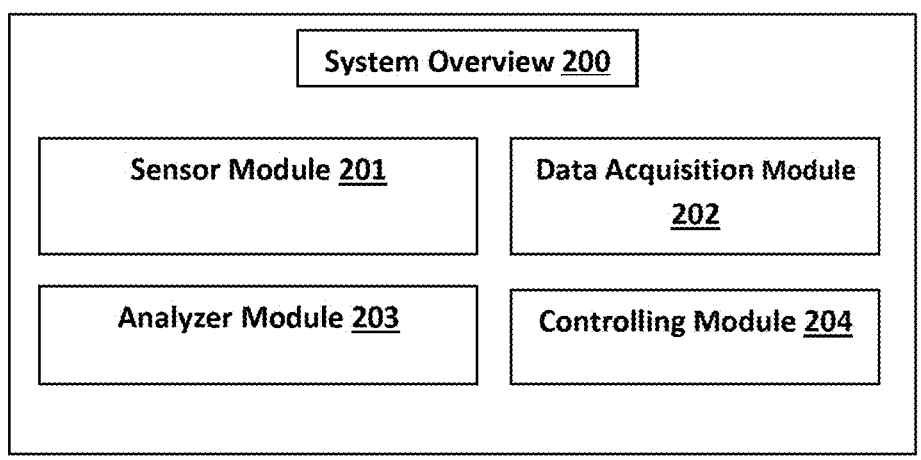
FIG. 2 illustrates the system components required for accurately measuring the real-time valid dew-point value of a material based on which the total moisture content of the material is determined according to an embodiment of the present invention.

FIG. 2 illustrates the system components 200 required for accurately measuring the real-time valid dew-point value of a material based on which the total moisture content of the material is determined. The system 200 comprises of the following components: a Sensor Module 201 configured to sense temperature and dew-point data of the material in the hopper 102, a Data Acquisition Module 202 configured to acquire the sensed data in the Server 104 for processing the acquired data and an Analyzer Module 203 configured to estimate the valid dew-point of the material and total moisture content of the material by implementing an algorithm. The algorithm determines the valid dew-point value of the material as follows:

Total mass of water vapor U(t) that has been forced out of the dryer at a given time t, can be obtained from the equation $$U(t) = k\int_0^t DP(t') * D_{Air}(t') * F(t') dt' \quad [1]$$

Where DP(t') is the dew-point at a given time t' in the outlet, $D_{Air}(t')$ is the density of air (since outlet air temperature is changing) and F(t') is the flow rate, which remains same all the time. A linear correction factor of k is assumed because dew-point measurement is never accurate and it is to offset the inaccurate dew-point.

Then water extracted from plastic between any two given points t and t2, is given by $$\Delta U(t-t2) = k\int_{t2}^t DP(t') * D_{Air}(t') * F(t') dt' \quad [2]$$

To measure the moisture content of plastic as V(t), following mass conservation equation is applied denoting total mass of plastic as Mp, $$Mp * \{V(t) - V(t2)\} = \Delta U(t-t2) = k\int_{t2}^t DP(t') * D_{Air}(t') * F(t') dt' \quad [3]$$

Assuming t2=0$^{th}$ time or any other time from several sets of measurement of drying, k is determined from linear regression which is supposed to remain constant as it reflects dew-points calibration adjustment.

Knowing k, total amount of water in plastic material can be estimated as well as remaining water in plastic or alike material can be determined.

In an embodiment, the following algorithm is used to determine the initial moisture content of the plastic:

$$V(0) = \left(\frac{k}{Mp}\right)\int_0^\infty DP(t') * D_{Air}(t') * F(t') dt' \quad [4]$$

Since within 15-30 minutes of outlet air attaining highest and saturated temperature, plastic moisture content is expected to reduce to 50-100 parts per million (ppm), practically, we can use an equation, (assuming Td is the time to arrive at high-saturated temperature at outlet of the dryer):

$$V(0) \cong \left(\frac{k}{Mp}\right)\int_0^{1.5*Td} DP(t') * D_{Air}(t') * F(t') dt' \quad [5]$$

Vapor content of plastic at top at any given time during material cycling:

$$V(t) = V(0) - \left(\frac{k}{Mp}\right)\int_0^t DP(t') * D_{Air}(t') * F(t') dt' \quad [6]$$

A Controlling Module 204 is configured to transmit data across modules in the system 200 by using any of the existing data transmitting technology such as Programmable Logic Controller (PLC), relay, and wireless sensor networks and so on.

Figure 3A:
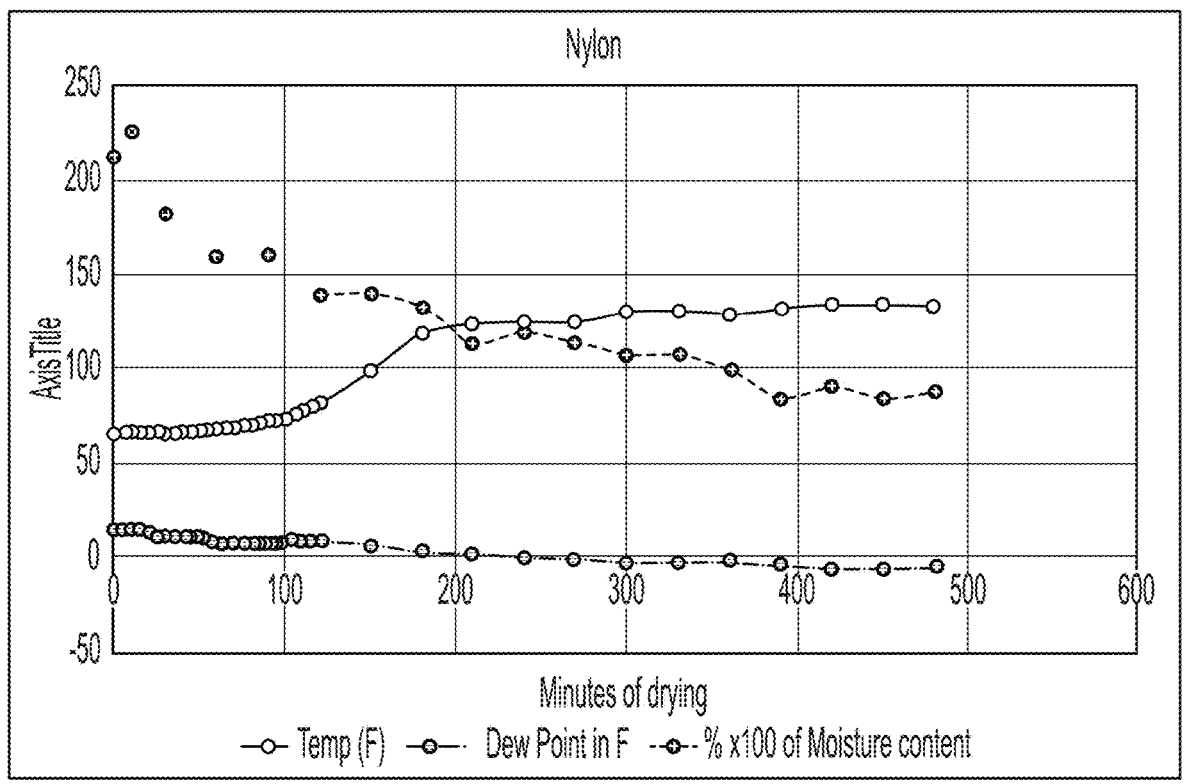
FIG. 3a and FIG. 3b illustrates a graphical representation of the dew-point measure for different materials according to an embodiment of the present invention.
Figure 3B:
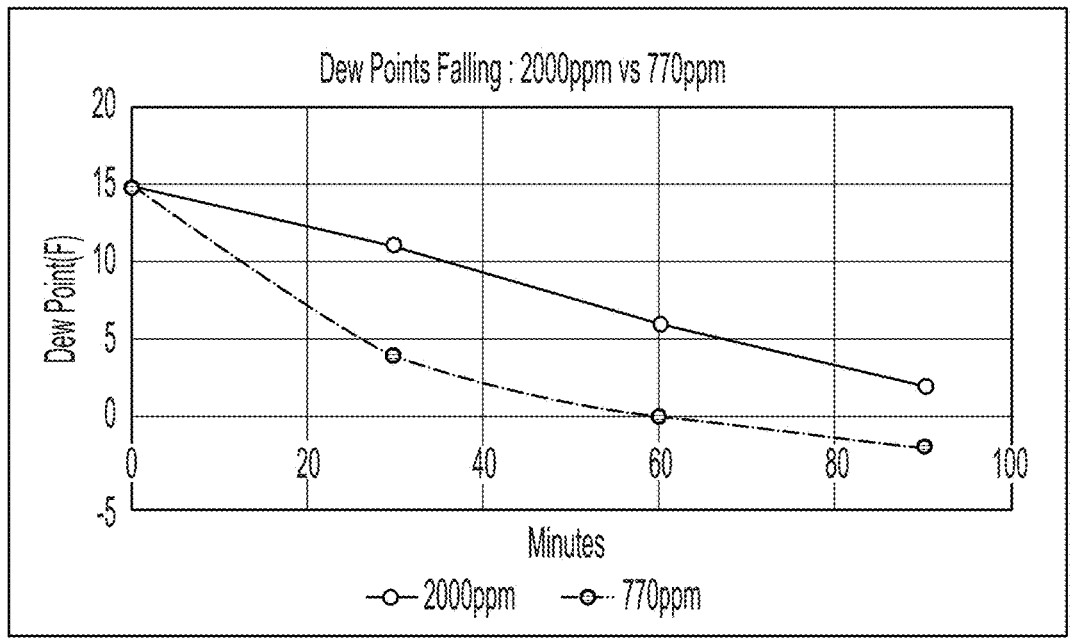

FIG. 3a and FIG. 3b illustrates a graphical representation of the dew-point measure for different materials. As depicted in FIG. 3a, as the temperature of the drying air is increased for the nylon material, the moisture content or the dew-point value of the nylon material is decreasing during the drying process. Further, as the temperature of the drying air is increased during the drying process the valid dew-point for the material decreases. As depicted in FIG. 3b, as the drying air is blown into the dryer unit 101, over a period the valid dew-point value of the material eventually decreases. In a preferred embodiment, the method automatically transmits the estimated valid dew-point value to the hopper 102 within which the total moisture content of the material can be determined by the algorithm. For example: one material depicts a dew-point of 2000 ppm and the other material depicts a dew-point of 770 ppm that has decreased over a period of time during the material drying process. The algorithm must determine the total moisture content of the material within the valid dew-point value estimated for the material.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims. Although the embodiments herein are described with various specific embodiments, it will be obvious for a person skilled in the art to practice the invention with modifications. However, all such modifications are deemed to be within the scope of the claims.

The invention claimed is:

1. A method for measuring real-time dew-point value of a resin and determining total moisture content of said resin in the course of drying said resin preparatory to molding or extruding said resin into finished plastic parts comprising:
  a) acquiring data from temperature and dew-point sensors positioned at a sole drying air outlet of a hopper having said resin therein;
  b) transmitting the acquired data, using programmable logic controller (PLC), relay, or wireless sensor networks, to a server;
  c) estimating initial moisture content of said resin before the drying process begins;
  d) continuously estimating moisture content of said resin during the drying process, by executing a second algorithm on the server;
  e) measuring a valid dew-point by determining at the server an inflection point of the continuously estimated moisture content for said resin; and
  f) determining the total moisture content of said material after determining said inflection point by executing a third algorithm on the server.

2. The method as claimed in claim 1, wherein said method estimates the initial moisture content of said resin by executing on the server this algorithm where k is an experience-based $V(0)=(k/Mp)\int_0^\infty DP(t')*D_{Air}(t')*F(t')dt'$ correction factor, $D_{air}$ is the measured initial density of air, MP is the total mass of material in the hopper, "DP" is initial dew-point of air in the hopper, and "t" is time using the acquired data.

3. Ancillary to a dryer having a hopper for hot air drying of granular resin material preparatory to molding or extrusion, a system for measuring real-time dew-point of $V(t)=V(0)-(k/Mp)\int_0^t DP(t')*D_{Air}(t')*F(t')dt'$ granular polymeric resin material to be molded or extruded into finished plastic products once the polymeric resin material is sufficiently dry, and determining total moisture content of said polymeric resin material comprising:
  a) a server;
  b) a temperature sensor for sensing temperature of drying air exiting the hopper;
  c) a dew-point sensor for sensing dew point of drying air entering the hopper;
  d) a communication system using a programmable logic controller, a relay, or a wireless network for providing data from the sensors to the server;
  e) the server comprising an analyzer module for
    i) estimating initial moisture content of said polymeric resin material by using an algorithm before the drying process begins;
    ii) estimating moisture content of said polymeric resin material at any instant of time during the drying process by using said algorithm;
    iii) measuring dew-point of said polymeric resin material by determining an inflection point of moisture content for said polymeric resin material as a function of time using a second algorithm; and
    iv) determining total moisture content of said polymeric resin material after determining said inflection point by using second algorithm.

4. The system of claim 3, wherein said system estimates the initial moisture content of said polymeric resin material by executing on the server a set of equations using the acquired data.

5. A method for continuously estimating moisture content of a resin and determining total moisture content of said resin in the course of drying said resin preparatory to molding or extruding said resin into finished plastic parts comprising:
  a) acquiring data from temperature and dew-point sensors positioned at a sole drying air outlet of a drying hopper having said resin therein;
  b) transmitting the acquired data, using a programmable logic controller (PLC), a relay, or a wireless sensor network, to a server;
  c) estimating initial moisture content of said resin before the drying process begins by executing in the server, this algorithm $V(0)=(k/Mp)\int_0^\infty DP(t')*D_{Air}(t')*F(t')dt'$ where k is an experience-based correction factor, $D_{air}$ is the measured initial density of air, MP is the total mass of material in the hopper, "DP" is initial dew-point of air in the hopper, and "t" is time;
  d) continuously estimating moisture content of said resin during the drying process by executing the algorithm $V(t)=V(0)-(k/Mp)\int_0^t DP(t')*D_{Air}(t')*F(t')dt'$ when the values are as noted above in limitation "c";
  e) determining the total moisture content of said material:
    i) using the algorithm $U(t)=k\int_0^t DP(t')*D_{Air}(t')*F(t')dt'$ to determine the mass of water vapor that has been forced from the resin;
    ii) measuring the weight of resin remaining in the hopper; and
    iii) dividing the measured weight of resin by the water vapor mass found in step (c) minus the water vapor forced from the resin as found in subsection (i) of step "e".

6. The method of claim 5 further comprising determining a valid dew point for the resin by:
  a) measuring a valid dew-point through determining an inflection point for said Resin by differentiating the algorithm of limitation "d" of claim 5; and
  b) determining the total moisture content of said material remaining in the hopper after determining said inflection point by:
    i) weighing the resin in the hopper;
    ii) using the algorithm $U(t)=k\int_0^t DP(t')*D_{Air}(t')*F(t')dt'$ to determine the mass of water vapor that has been forced from the resin;
    iii) measuring the weight of resin remaining in the hopper; and
    iv) dividing the measured weight of resin remaining in the hopper by the water vapor mass that has been forced from the resin.

* * * * *